United States Patent [19]

Schläfer et al.

[11] Patent Number: 4,960,872
[45] Date of Patent: Oct. 2, 1990

[54] WATER-SOLUBLE MONOAZOPYRAZOLONE DYESTUFFS HAVING FIBER REACTIVE GROUPS OF THE VINYLSULFONE SERIES

[75] Inventors: Ludwig Schläfer, Kelkheim; Günther Schwaiger, Frankfurt; Werner H. Russ, Hofheim am Taunus, all of Fed. Rep. of Germany

[73] Assignee: Hoechst Aktiengesellschaft, Frankfurt am Main, Fed. Rep. of Germany

[21] Appl. No.: 151,720

[22] Filed: Feb. 3, 1988

[30] Foreign Application Priority Data

Feb. 6, 1987 [DE] Fed. Rep. of Germany ....... 3703565

[51] Int. Cl.⁵ ...................... C09B 62/51; D06P 1/384; D06P 3/66; D06P 3/24
[52] U.S. Cl. ..................................... 534/642; 534/582
[58] Field of Search ............................... 534/642, 638

[56] References Cited

U.S. PATENT DOCUMENTS

| | | | |
|---|---|---|---|
| 4,066,638 | 1/1978 | Fuchs et al. | 534/642 |
| 4,134,887 | 1/1979 | Fuchs et al. | 534/642 |
| 4,315,865 | 2/1982 | Hoyer et al. | 534/642 X |
| 4,334,076 | 6/1982 | Steuernagel et al. | 534/642 X |
| 4,564,672 | 1/1986 | Schlafer | 534/642 X |
| 4,703,112 | 10/1987 | Mischke et al. | 534/642 |

FOREIGN PATENT DOCUMENTS

| | | | |
|---|---|---|---|
| 2362683 | 6/1975 | Fed. Rep. of Germany | 534/642 |
| 1401032 | 4/1965 | France | 534/642 |
| 1268699 | 3/1972 | United Kingdom | 534/642 |
| 1336454 | 11/1973 | United Kingdom | 534/642 |

Primary Examiner—Floyd D. Higel
Assistant Examiner—Fiona T. Powers

[57] ABSTRACT

Water-soluble monoazo compounds corresponding to the following general formula (1) which have valuable fiber-reactive dyestuff properties and which dye materials, in particular cellulose fibers, containing carboxamide and/or hydroxy groups in fast, yellow shades.

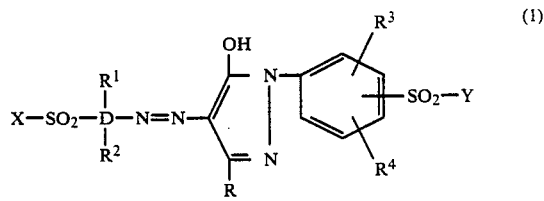

in which the symbols have the following meanings:
D is a benzene ring or a radical of the formula

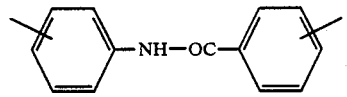

$R^1$ and $R^3$, independently of one another, are both hydrogen, methyl, ethyl, methoxy, ethoxy, chlorine, bromine, carboxy or sulfo,
$R^2$ and $R^4$, independently of one another, are each hydrogen, methyl, ethyl, methoxy, ethoxy, chlorine or bromine,
R is carboxy or lower carboalkoxy, and
X and Y, independently of one another, are each β-thiosulfatoethyl or β-sulfatoethyl or vinyl, but, in the event that x and/or Y is vinyl, the radicals $R^1$ and/or $R^2$ are necessarily sulfo.

15 Claims, No Drawings

WATER-SOLUBLE MONOAZOPYRAZOLONE DYESTUFFS HAVING FIBER REACTIVE GROUPS OF THE VINYLSULFONE SERIES

The invention is in the field of fiber-reactive azo dyestuffs. Monoazo compounds containing a 1-phenylpyrazol-5-one coupling component are described in British Pat. No. 1,268,699; they contain, as fiber-reactive radical(s), one or two β-phosphatoethylsulfonyl groups attached to the 1-phenyl radical of the coupling component or to the benzene radical of the diazo component or to both of these. These known monoazo compounds, which can be used as fiber-reactive dyestuffs, possess, however, only a slight affinity and cannot be employed in one of the dyeing processes most important in industry, namely the exhaustion process from a long liquor. A compound of similar structure is known from Example 6 of German Offenlegungsschrift No. 2,362,683, but this is completely insoluble in water and is only suitable for use as a disperse dyestuff for dyeing a cotton/polyester mixed fabric at dyeing temperatures of 130° C. On cotton, using the dyeing and printing processes customary for water-soluble, fiber-reactive dyestuffs, it gives only weak and uneven dyeings and prints.

Furthermore, monoazo compounds having a 1-phenylpyrazolon-5-one coupling component in which the 1-phenyl radical is substituted by a fiber-reactive β-sulfatoethylsulfonyl, β-thiosulfatoethylsulfonyl or vinylsulfonyl group are known from British Pat. No. 1,336,454. However, these known monoazo dyestuffs have a fixing capacity which appears to be still in need of improvement for present requirements for fiber-reactive dyestuffs, and which no longer gives complete technical satisfaction. Monoazo compounds corresponding to the general formula (1) which possess improved fiber-reactive dyestuff properties have now been found by means of the present invention.

In formula (1) the symbols have the following meanings:

D is a benzene ring or a radical of the general formula (2)

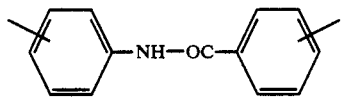
(2)

$R^1$ is hydrogen, methyl, ethyl, methoxy, ethoxy, chlorine, bromine, carboxy or sulfo, $R^2$ is hydrogen, methyl,-ethyl, methoxy, ethoxy, chlorine or bromine, $R^3$ is hydrogen, methyl, ethyl, methoxy, ethoxy, chlorine, bromine, carboxy or sulfo and $R^4$ is hydrogen, methyl, ethyl, methoxy, ethoxy, chlorine or bromine, it being possible for $R^1$, $R^2$, $R^3$ and $R^4$ to have meanings identical with one another or different from one another;

R is carboxy or carboalkoxy having 2 to 5 carbon atoms, such as carboethoxy and carbomethoxy;

X is a β-thiosulfatoethyl group or, preferably, a β-sulfatoethyl group, or

X is the vinyl group, and in that case $R^1$ or $R^2$ or both have to represent a sulfo group in each case, and Y is a βthiosulfonatoethyl group or, preferably, a β-sulfatoethyl group, or Y is the vinyl group, and in that case $R^1$ or $R^2$ or both have to represent a sulfo group in each case, and the two groups $-SO_2-X$ and $-SO_2-Y$ can have meanings identical with one another or different from one another, and both groups are preferably attached to the particular benzene nucleus in the meta-position or paraposition relative to the azo group or to the nitrogen atom of the carbamoyl group of the radical of the formula (2) or relative to the $N^1$ atom of the pyrazolone, respectively.

Preferably, the radicals X and Y in the compounds (1) are both, simultaneously, a β-sulfatoethyl group. Compounds of the formula (1) in which $R^1$ is hydrogen are also preferred, as are also those in which $R^3$ is hydrogen.

Preference also attaches to compounds of the general formula (1) in which $R^1$ denotes a hydrogen atom, a methyl or methoxy or sulfo group or a chlorine atom and $R^2$ is a hydrogen atom or a methoxy group, and also to compounds of the formula (1) in which $R^3$ denotes a hydrogen atom or a methyl or methoxy group and $R^4$ denotes a hydrogen atom or a methoxy group.

In the preceding and following specifications, sulfo groups are groups corresponding to the general formula $-SO_3M$, carboxy groups are groups corresponding to the general formula $-COOM$, thiosulfato groups are groups corresponding to the general formula $-S-SO_3M$ and sulfato groups are groups corresponding to the general formula $-OSO_3M$, M denoting in each case a hydrogen atom or an alkali metal, such as sodium, potassium or lithium.

The monoazo compounds according to the invention can be present in the form of their acid compounds and in the form of their salts; they are preferably in the form of their alkali metal salts and are preferably used in the form of these salts for dying (including printing) materials, in particular fiber materials, containing hydroxy and/or carboxamide groups.

The present invention also relates to a process for the preparation of the new compounds of the general formula (1). They can be prepared in accordance with the invention by coupling a diazonium salt of an aromatic amino compound corresponding to the general formula (3)

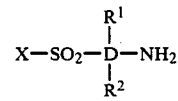
(3)

in which D, $R^1$, $R^2$ and X have the meanings mentioned above or X represents the β-hydroxyethyl group, with a compound corresponding to the general formula (4)

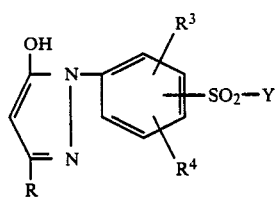
(4)

in which R, $R^3$, $R^4$ and Y have the meanings mentioned above or Y represents the hydroxyethyl group, and, in the event that X or Y or both of them represent a β-hydroxyethyl group, by converting the resulting monoazo compound into the compound (1) containing the corresponding β-sulfatoethylsulfonyl group by means of a customary sulfating agent, such as, for example, 95 to 100% strength sulfuric acid, sulfuric acid containing sulfur trioxide or chlorosulfonic acid, at a temperature of, for example, between 0° and 25° C.

Azo compounds according to the invention in which the radical of the diazo component is identical with the phenyl radical attached in the 1-position of the pyrazol-5-one coupling component, such as compounds corresponding to a general formula (1a)

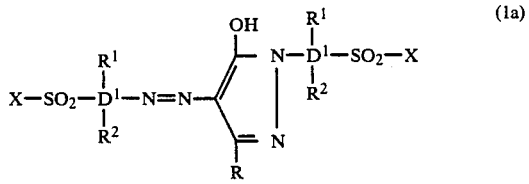

(1a)

in which R has the meaning mentioned above, both of the $D^1$s denote a benzene ring in each case and the substituents $R^1$, $R^2$ and $-SO_2-X$ on $D^1$ each have the meanings mentioned above, both of the benzene radicals substituted by $R^1$, $R^2$ and $-SO_2-X$ being identical with one another in structure, can also be prepared, in accordance with the invention, by reacting a diazonium salt of an aromatic amine of the general formula (3a)

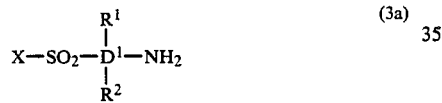

(3a)

in which $D^1$, $R^1$, $R^2$ and X have the meanings mentioned above, in a twice-molar amount with a dialkyl acetylsuccinate having alkyl groups with 1 to 4 carbon atoms in each case, preferably 1 or 2 carbon atoms in each case, and, in the event that the two Xs represent a β-hydroxyethyl group, converting the resulting monoazo compound into the β-sulfatoethylsulfonyl compound of the formula (1) by means of a customary sulfating agent, such as, for example, 95 to 100% strength sulfuric acid, sulfuric acid containing sulfur trioxide or chlorosulfonic acid, at a temperature of, for example, between 0° and 25° C.

The coupling reaction between a compound of the general formula (4) and the diazonium salt of an aromatic amine of the general formula (3) is effected analogously to the customary and known procedures, for example in an aqueous medium at a pH between 4 and 7.5, preferably between 4 and 7, and at a temperature between 0° and 35° C., preferably between 10° and 25° C., it being also possible, if X and Y are both β-hydroxyethyl groups, to carry out the coupling in a weakly alkaline range; such as the range between 7.5 and 9.

When synthesizing compounds corresponding to the general formula (1) by reacting 2 moles of a diazonium salt of an amine of the formula (3) or (3a) with one mole of a dialkyl acetylsuccinate, it is advantageous to follow a procedure in which the dialkyl acetylsuccinate is added to an aqueous suspension or solution, adjusted to a pH of 4.5 to 5.5, of a twice-molar amount of a diazonium salt of the aromatic amine at a temperature between 5° and 25° C. and at a pH between 3.5 and 5.5, preferably between 4 and 5, and, after some time, to continue and complete the reaction at a pH between 6 and 7.5 and a temperature between 15° and 25° C. In this procedure, the first step is coupling of one mole of the diazonium salt with the acetylsuccinic acid and cyclization to give the pyrazolone, and this is followed by coupling between the pyrazolone formed and the second mole of the diazonium salt to give the monoazo compound according to the invention. If the group X in the starting compound (3a) is a β-hydroxyethyl group, the coupling can also be carried out in an alkaline range, for example at a pH between 6.5 and 9. This one-pot procedure is analogous to that described in U.S. Pat. No. 2,457,823.

The precipitation and isolation of the compounds of the general formula (1), prepared in accordance with the invention, from the synthesis solutions can be effected by generally known methods, for example either by precipitation from the reaction medium by means of electrolytes, such as, for example, sodium chloride or potassium chloride, or by evaporation of the reaction solution, for example spray drying, it being possible to add a buffer substance to this reaction solution.

The compounds, according to the invention, of the general formula (1)—designated as compounds (1) in the following text—have fiber-reactive properties and possess valuable dyestuff properties. They can, therefore, be used for dyeing (including printing) natural, regenerated or synthetic materials containing hydroxy groups and/or carboxamide groups, for example materials in the form of sheet-like structures, such as paper and leather, or polyamide or polyurethane, but particularly materials of this type in fiber form, such as cellulose fiber materials, silk, wool and synthetic polyamide and polyurethane fibers. The solutions obtained in the synthesis of the compounds (1) can also be used directly as a liquid preparation for dyeing, if appropriate after the addition of a buffer substance, and also, if appropriate, after concentration.

When used in accordance with the invention, the compounds (1) can be applied to and fixed on the substrates mentioned, in particular on the fiber materials mentioned, by the application techniques which are known for water-soluble dyestuffs, in particular fiber-reactive dyestuffs, for example by applying the compound (1) in a dissolved form to the substrate or introducing it into the latter and fixing it on or in the substrate, if appropriate by the action of heat and/or, if appropriate, by the action of an agent having an alkaline action. Dyeing and fixing procedures of this type have been described many times in the literature, for example in German Offenlegungsschrift No. 3,025,572.

The present invention also relates, therefore, to the use of the compounds (1) for dyeing (including printing) materials containing hydroxy and/or carboxamide groups, and to processes for their use on these substrates. The materials used are preferably in the form of fiber materials, especially in the form of textile fibers, such as yarns, wound packages and fabrics. The procedure used in this regard can be analogous to known procedures for applying and fixing fiber-reactive dyestuffs.

The monoazo compounds according to the invention are distinguished by a high depth of color and a good color build-up; accordingly, they afford deep dyeings and prints of a yellow shade. In particular, their dyeings and prints on cellulose fiber materials possess good fastness properties to use and manufacturing processes, such as, for example, good fastness properties to light, washing, chlorinated water, exhaust gases, ironing, pleating, decatizing, dry cleaning, rubbing, acid, alkali and cross-dyeing, and also good fastness properties to alkaline and acid perspiration. The degrees of fixing of the compounds according to the invention are very high, as a result of which the non-fixed proportion of the compound according to the invention is only slight and, accordingly, when dyeings and prints are finished, only a little of this dyestuff compound used reaches the effluent via the rinsing or washing water. In printing, the monoazo compounds according to the invention afford sharp outlines with a clear white background; the prints and dyeings do not mark off onto adjacent material, nor do they bleed, and they display a high stability to storage under acid conditions. In addition,.the compounds according to the invention are not phototropic.

The following Examples serve to illustrate the invention. The parts are parts by weight and the percentages are percentages by weight, unless a note is made to the contrary. The ratio between parts by weight and parts by volume is that of kilograms to liters.

The compounds described in terms of formulae in these Examples are shown in the form of the free acids; in general, they are prepared and isolated in the form of their sodium or potassium salts and are used for dyeing in the form of their salts. Similarly, the starting compounds and components mentioned in the form of the free acid in the Examples below, in particular the Tabular Examples, can be employed in the synthesis as such or in the form of their salts, preferably alkali metal salts, such as sodium or potassium salts. The absorption maxima ($\lambda_{max}$ values) indicated in the visible range were determined on an aqueous solution of the alkali metal salts.

EXAMPLE 1

A neutral solution of the sodium salt of 28.1 parts of 4-($\beta$-sulfatoethylsulfonyl)-aniline and 6.9 parts of sodium nitrite in 100 parts of water is added, at 10° C. and with vigorous stirring, to a mixture of 100 parts of ice and 35 parts of 30% strength aqueous hydrochloric acid. Stirring is continued for a further hour and the pH of the suspension of the diazonium salt is adjusted to a value of 5 with sodium carbonate, and 11.4 parts of diethyl acetylsuccinate are then added slowly in the course of 30 minutes, the reaction temperature being kept at 10° to 15° C. and the pH at a value between 4 and 5. Stirring is continued for a further hour, the pH is raised to a value of 6 to 6.5, the mixture is stirred for a further 5 hours at 20° to 25° C. and its pH is adjusted to a value of 4, it is clarified with 10 parts of active charcoal and filtered, and the filtrate is evaporated or spray dried.

The sodium salt of the compound, according to the invention, of the formula

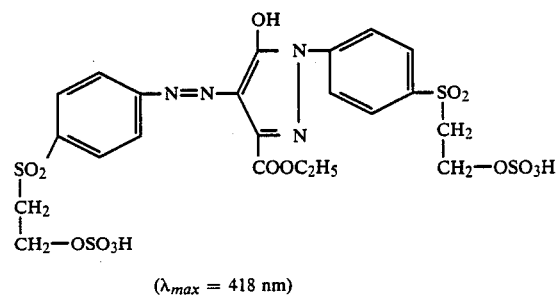

($\lambda_{max}$ = 418 nm)

is obtained in the form of a product containing electrolyte. This monoazo compound according to the invention possesses very good fiber-reactive dyestuff properties and affords, by the dyeing and printing processes customary for fiber-reactive dyestuffs, neutral, yellow dyeings and prints in a very good dyestuff yield on the materials mentioned in the description, such as, in particular, cellulose fiber materials.

The dyeings and prints which can be obtained in accordance with the invention are distinguished by excellent fastness properties to light, both in the dry state and when moistened with drinking water or with an alkaline or acid perspiration solution, and also by good fastness properties to washing (such as washing at 60° C. and 95° C.), by very good fastness to water, by very good fastness properties to alkaline and acid perspiration, by very good fastness properties to alkaline and acid cross-dyeing and by very good stability to storage under acid conditions.

EXAMPLE 2

The monoazo compound, according to the invention, of Example 1 can also be prepared as follows: An aqueous diazonium salt suspension is prepared from 28.1 parts of 4-($\beta$-sulfatoethylsulfonyl)-aniline by the procedure of Example 1, and 22.7 parts of diethyl acetylsuccinate are added to it, the pH is .then adjusted to a value of 4.5 with sodium carbonate and the reaction mixture is stirred at this pH and at a temperature of 0° to 25° C. until diazonium salt can no longer be detected; the pH is then raised to a value of 6 to 7.5 and the cyclization is continued for several further hours at 20° to 25° C.

The diazonium salt suspension prepared in accordance with Example 1 from 28.1 parts of 4-($\beta$-sulfatoethylsulfonyl)aniline is again added to this aqueous solution of the coupling component 1-[4'-($\beta$-sulfatoethylsulfonyl)-phenyl]-3-carboethoxypyrazol-5-one, the pH is adjusted to a value from 5 to 6 and stirring is continued until the coupling reaction is complete.

The monoazo compound according to the invention is isolated in the manner indicated in Example 1. It possesses the same good fiber-reactive dyestuff properties.

EXAMPLE 3

A monoazo compound according to the invention is prepared by first hydrolyzing 24.8 parts of 4-($\beta$-hydroxyethylsulfonyl)-acetanilide by boiling for two hours in an aqueous solution of hydrochloric acid (50 parts of water and 25 parts of concentrated hydrochloric acid), the mixture is then allowed to cool, 30 parts of ice are added and diazotization is carried out using 18.5 parts of 40% strength aqueous sodium nitrite solution. The diazonium salt suspension is stirred for a further hour, the pH is raised to a value of 3 and 4 parts of sodium bicarbonate and 22.7 parts of diethyl acetylsuccinate are then added. The reaction mixture is stirred for a further 10 hours at a temperature of 10° to 20° C. and a pH between 3 and 4, until it is no longer possible to detect the presence of the diazonium salt, and the pH of the mixture is then adjusted to a value of 11 and it is heated to 80° C. and stirred for a further hour at this temperature and at this pH. The batch is then decolorized by means of two parts of sodium dithionite and is subsequently filtered. 100 parts of ice water are added to the filtrate and the pH is adjusted to a value of 2.5 by means of 46 parts of 30% strength aqueous hydrochloric acid. The synthesized 1-[4'-($\beta$-hydroxyethylsulfonyl)-phenyl]-3-carboxypyrazol5-one which is precipitated is filtered off with suction and dried and is then introduced, at 15° to 25° C., into a mixture of 65 parts of 100% strength sulfuric acid and 10 parts of 50% strength oleum, and this mixture is stirred until a clear solution is obtained, which is then poured onto 300 parts of ice and the pH is adjusted to a value of 4.5 by means of about 90 parts of calcium carbonate; the mixture is heated to 80° C. and the precipitated calcium sulfate is filtered off with suction and rinsed with 200 parts of hot water. The filtrate, which contains the 1-[4'-($\beta$-sulfatoethylsulfonyl)-phenyl]-3-carboxypyrazol-5-one in solution, is combined with the wash water, and a diazonium salt solution prepared in a customary manner from 24.5 parts of 2-bromo-4-($\beta$-sulfatoethylsulfonyl)-aniline is added, and the coupling reaction is carried out at a temperature between 20° and 25° C. and at a pH between 5 and 6.

The resulting monoazo compound according to the invention is salted out with sodium chloride. It is obtained as the sodium salt in the form of a product containing electrolyte (mainly sodium chloride); it has the following formula, written in the form of the free acid:

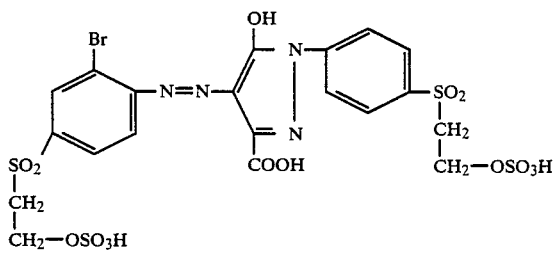

($\lambda_{max}$ = 410 nm)

and exhibits very good fiber-reactive dyestuff properties; it dyes the fiber materials mentioned in the description, such as, in particular, cellulose fiber materials, in deep, yellow color shades by the methods of application and fixation which are customary in industry for fiber-reactive dyestuffs. The compound according to the invention has a very high capacity for being fixed, and the dyeings and prints which it affords have good to very good fastness properties, such as, for example, those mentioned for the monoazo compound, according to the invention, of Example 1.

EXAMPLE 4

A monoazo compound, according to the invention, containing the $\beta$-thiosulfatoethylsulfonyl group is prepared by adjusting the pH of a solution of 35.6 parts of the monoazo compound described in Example 1 in 200 parts of water at a temperature of 20° C. to a value between 10 and 11 by means of an aqueous solution of sodium hydroxide; the resulting suspension is stirred for a further 5 minutes and 17.4 parts of sodium thiosulfate are then added, the pH is adjusted to a value between 5 and 6 with acetic acid, and the reaction mixture is heated to 60° to 70° C. and stirred for a further 6 hours within this pH range. The reaction mixture is then clarified while hot in a customary manner, and the filtrate is evaporated or spray dried.

A yellow powder containing electrolyte salts and the sodium salt of the compound, according to the invention, of the formula

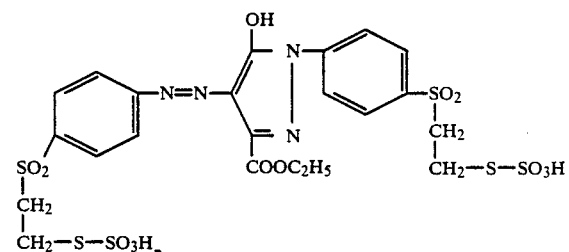

($\lambda_{max}$ = 419 nm).

is obtained

This $\beta$-thiosulfatoethylsulfonylmonoazo compound according to the invention also possesses very good fiber-reactive dyestuff properties and affords, on the fiber materials mentioned in the description, in particular cellulose fiber materials, by the dyeing and printing processes customary in industry, dyeings and prints in deep, neutral yellow shades having the same good to very good fastness properties as have been described for the $\beta$-sulfatoethylsulfonylmonoazo compound, according to the invention, of Example 1.

EXAMPLES 5 TO 85

Further monoazo compounds according to the invention are described in the Tabular Examples below by means of the components corresponding to a general formula (A)

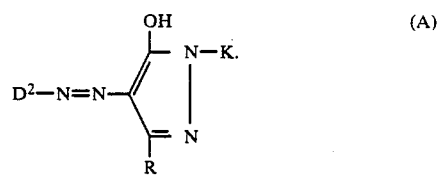

They can be prepared in a manner according to the invention, for example in accordance with one of the above Illustrative Embodiments, by means of the components which are evident in the particular Tabular Example in conjunction with formula (A), such as the diazo component $D^2$—$NH_2$ and the coupling component corresponding to the general formula (B)

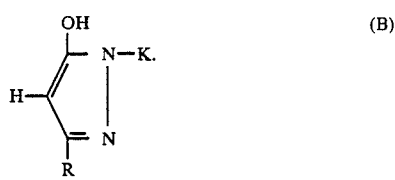

They possess fiber-reactive dyestuff properties and afford, in particular on cellulose fiber materials, by the methods of application and fixing which are customary for fiber-reactive dyestuffs, deep, fast dyeings and prints in the color shades indicated in the particular Tabular Example for dyeings on cotton.

| Example | Monoazo compound of the formula (A) | | | Color shade ($\lambda_{max} = ..$ nm) |
|---|---|---|---|---|
| | Radical $D^2$ | Radical R | Radical K | |
| 5 | 3-(β-Sulfatoethylsulfonyl)-phenyl | Carboethoxy | 4'-(β-Sulfatoethylsulfonyl)-phenyl | yellow (420) |
| 6 | 2-Methoxy-5-(β-sulfatoethylsulfonyl)-phenyl | " | " | yellow (436) |
| 7 | 2-Methoxy-5-methyl-4-(β-sulfatoethylsulfonyl)-phenyl | " | " | yellow (446) |
| 8 | 2,5-Dimethoxy-4-(β-sulfatoethylsulfonyl)-phenyl | " | " | yellow (456) |
| 9 | 2-Methoxy-5-chloro-4-(β-sulfatoethylsulfonyl)-phenyl | " | " | yellow |
| 10 | 2-Methoxy-4-(β-sulfatoethylsulfonyl)-phenyl | " | " | yellow |
| 11 | 4-Methoxy-5-(β-sulfatoethylsulfonyl)-phenyl | " | " | yellow |
| 12 | 2-Chloro-5-(β-sulfatoethylsulfonyl)-phenyl | " | " | yellow |
| 13 | 2-Bromo-4-(β-sulfatoethylsulfonyl)-phenyl | " | " | yellow (412) |
| 14 | 4-Chloro-5-(β-sulfatoethylsulfonyl)-phenyl | " | " | yellow |
| 15 | 4-{N-[3'-(β-sulfatoethylsulfonyl)-phenyl]-carbamoyl}-phenyl | " | " | yellow (426) |
| 16 | 2-Sulfo-5-(β-sulfatoethylsulfonyl)-phenyl | " | " | yellow |
| 17 | 2-Sulfo-4-(β-sulfatoethylsulfonyl)-phenyl | " | " | yellow |
| 18 | 2,6-Dichloro-4-(β-sulfatoethylsulfonyl)-phenyl | " | " | yellow |
| 19 | 4-Methoxy-5-(β-sulfatoethylsulfonyl)-phenyl | Carbomethoxy | " | yellow (435) |
| 20 | 4-(β-Sulfatoethylethylsulfonyl)-phenyl | " | " | yellow |
| 21 | 3-(β-Sulfatoethylethylsulfonyl)-phenyl | " | " | yellow |
| 22 | 2-Methoxy-5-(β-sulfatoethylsulfonyl)-phenyl | " | " | yellow |
| 23 | 2-Methoxy-5-methyl-4-(β-sulfatoethylsulfonyl)-phenyl | " | " | yellow (445) |
| 24 | 2,5-Dimethoxy-4-(β-sulfatoethylsulfonyl)-phenyl | " | " | yellow (455) |
| 25 | 2-Chloro-5-(β-sulfatoethylsulfonyl)-phenyl | " | " | yellow |
| 26 | 2-Bromo-4-(β-sulfatoethylsulfonyl)-phenyl | " | " | yellow (412) |
| 27 | 4-(β-Sulfatoethylsulfonyl)-phenyl | Carboxy | " | yellow |
| 28 | 3-(β-Sulfatoethylsulfonyl)-phenyl | " | " | yellow (417) |
| 29 | 2-Methoxy-5-(β-sulfatoethylsulfonyl)-phenyl | " | " | yellow (441) |
| 30 | 2-Methoxy-5-methyl-4-(β-sulfatoethylsulfonyl)-phenyl | " | " | yellow (447) |
| 31 | 2,5-Dimethoxy-4-(β-sulfatoethylsulfonyl)-phenyl | " | " | yellow (450) |

-continued

| Example | Monoazo compound of the formula (A) Radical D² | Radical R | Radical K | Color shade ($\lambda_{max} =$ .. nm) |
|---|---|---|---|---|
| 32 | 2-Methoxy-4-(β-sulfatoethylsulfonyl)-phenyl | " | " | yellow |
| 33 | 4-Methoxy-5-(β-sulfatoethylsulfonyl)-phenyl | " | " | yellow (436) |
| 34 | 2-Chloro-5-(β-sulfatoethylsulfonyl)-phenyl | " | " | yellow (435) |
| 35 | 2-Bromo-4-(β-sulfatoethylsulfonyl)-phenyl | " | " | yellow (416) |
| 36 | 4-{-[3'-(β-Sulfatoethylsulfonyl)-phenyl]-carbamoyl}-phenyl | " | " | yellow (427) |
| 37 | 2-Sulfo-5-(β-sulfatoethylsulfonyl)-phenyl | " | " | yellow |
| 38 | 2-Sulfo-4-(β-sulfatoethylsulfonyl)-phenyl | " | " | yellow |
| 39 | 2-Carboxy-5-(β-sulfatoethylsulfonyl)-phenyl | " | " | yellow |
| 40 | 2-Carboxy-4-(β-sulfatoethylsulfonyl)-phenyl | " | " | yellow |
| 41 | 4-(β-Thisulfatoethylsulfonyl)-phenyl | " | " | yellow |
| 42 | 4-(β-Thisulfatoethylsulfonyl)-phenyl | Carboethoxy | " | yellow (420) |
| 43 | 4-(β-Thisulfatoethylsulfonyl)-phenyl | Carbomethyl | " | yellow |
| 44 | 4-(β-Thisulfatoethylsulfonyl)-phenyl | Carboxy | 4'-(β-Thiosulfatoethylsulfonyl)-phenyl | yellow (421) |
| 45 | 4-(β-Thisulfatoethylsulfonyl)-phenyl | Carboethoxy | " | yellow |
| 46 | 2,5-Dimethoxy-5-(β-sulfatoethylsulfonyl)-phenyl | Carboxy | 2'-Methoxy-5'-(β-sulfatoethylsulfonyl)-phenyl | yellow (460) |
| 47 | 2-Methoxy-5-(β-sulfatoethylsulfonyl)-phenyl | " | " | yellow |
| 48 | 4-(β-Sulfatoethylsulfonyl)-phenyl | Carbomethoyx | 4'-(β-Thiosulfatoethylsulfonyl)-phenyl | yellow (420) |
| 49 | 4-(β-Sulfatoethylsulfonyl)-phenyl | Carboxy | 4'-(β-Sulfatoethylsulfonyl)-phenyl | yellow |
| 50 | 2-Methoxy-5-(β-sulfatoethylsulfonyl)-phenyl | " | " | yellow (438) |
| 51 | 4-(β-Sulfatoethylsulfonyl)-phenyl | Carboethoxy | 3'-(β-Sulfatoethylfonyl)-phenyl | yellow (418) |
| 52 | 3-(β-Sulfatoethylsulfonyl)-phenyl | " | " | yellow |
| 53 | 2-Methoxy-5-(β-sulfatoethylsulfonyl)-phenyl | " | " | yellow |
| 54 | 2-Methoxy-5-methyl-4-(β-sulfatoethylsulfonyl)-phenyl | " | " | yellow (440) |
| 55 | 2,5-Dimethoxy-4-(β-sulfatoethylsulfonyl)-phenyl | " | " | yellow (455) |
| 56 | 2-Methoxy-4-(β-sulfatoethylsulfonyl)-phenyl | " | " | yellow |
| 57 | 4-Methoxy-5-(β-sulfatoethylsulfonyl)-phenyl | " | " | yellow |
| 58 | 2-Chloro-5-(β-sulfatoethylsulfonyl)-phenyl | " | " | yellow |
| 59 | 2-Bromo-4-(β-sulfatoethylsulfonyl)-phenyl | " | " | yellow (412) |
| 60 | 2-Sulfo-3-(β-sulfatoethylsulfonyl)-phenyl | " | " | yellow |
| 61 | 2-Carboxyl-3-(β-sulfatoethylsulfonyl)-phenyl | " | " | yellow |
| 62 | 2-Carboxyl-4-(β-sulfatoethylsulfonyl)- | " | " | yellow |

-continued

| Example | Monoazo compound of the formula (A) | | | Color shade ($\lambda_{max}$ = .. nm) |
|---|---|---|---|---|
| | Radical $D^2$ | Radical R | Radical K | |
| 63 | 4-(β-Sulfatoethyl-sulfonyl)-phenyl | " | " | yellow |
| 64 | 3-(β-Sulfatoethyl-sulfonyl)-phenyl | Carbomethoxy | " | yellow (420) |
| 65 | 2-Methoxy-5-(β-sulfatoethylsulfonyl)-phenyl | " | " | yellow |
| 66 | 2-Methoxy-5-methyl-4-(β-sulfatoethyl-sulfonyl)-phenyl | " | " | yellow (448) |
| 67 | 2,5-Dimethoxy-4-(β-sulfatoethylsul-fonyl)-phenyl | " | " | yellow (454) |
| 68 | 2-Bromo-4-(β-sulfato ethylsulfonyl)-phenyl | " | " | yellow (414) |
| 69 | 2-Sulfo-4-(β-sulfatoethylsulfo-nyl)-phenyl | " | " | yellow |
| 70 | 4-(β-Sulfatoethyl-sulfonyl)-phenyl | Carboxyl | 4'-(β-Sulfatoethylsulfonyl)-phenyl | yellow (420) |
| 71 | 3-(β-Sulfatoethyl-sulfonyl)-phenyl | " | " | yellow (418) |
| 72 | 2-Methoxy-5-(β-sulfatoethylsulfonyl)-phenyl | " | " | yellow (436) |
| 73 | 2-Methoxy-5-methyl-4-(β-sulfatoethyl-sulfonyl)-phenyl | " | " | yellow (445) |
| 74 | 2,5-Dimethoxy-4-(β-sulfatoethylsulfonyl)-phenyl | " | " | yellow (456) |
| 75 | 2-Methoxy-4-(β-sulfatoethylsulfonyl)-phenyl | " | " | yellow |
| 76 | 4-Methoxy-5-(β-sulfatoethylsulfonyl)-phenyl | " | " | yellow |
| 77 | 2-Bromo-4-(β-sulfato-ethylsulfonyl)-phenyl | " | " | yellow (412) |
| 78 | 2-Chloro-5-(β-sulfatoethylsulfonyl)-phenyl | Carboxy | " | yellow |
| 79 | 4-{N-[3'-(β-sulfato-ethylsulfonyl)-phenyl]-carbamoyl}-phenyl | " | " | yellow (427) |
| 80 | 4-(β-Sulfatoethyl-sulfonyl)-phenyl | Carboethoxy | 2'-Bromo-4'-(β-Sulfatoethylsulfonyl)-phenyl | yellow |
| 81 | 3-(β-Sulfatoethyl-sulfonyl)-phenyl | " | " | yellow |
| 82 | 2-Bromo-4-(β-sulfato ethylsulfonyl)-phenyl | " | " | yellow |
| 83 | 2-Methoxy-5-(β-sulfatoethylsulfo-nyl)-phenyl | " | " | yellow |
| 84 | 4-(β-Sulfatoethyl-sulfonyl)-phenyl | Carboxy | 2'-Methoxy-5'-(β-sulfatoethylsulfonyl)-phenyl | yellow |
| 85 | 2-Bromo-4-(β-sulfatoethylsulfonyl)-phenyl | " | " | yellow |

We claim:

1. A water-soluble monoazo compound of the formula

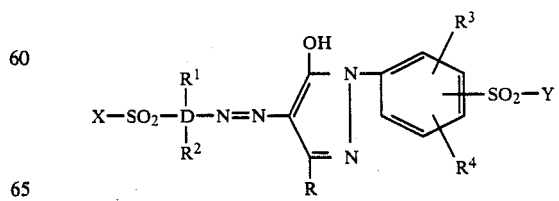

in which:

D is a benzene ring or a group of the formula

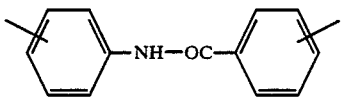

R[1] is hydrogen, methyl, ethyl, methoxy, ethoxy, chlorine, bromine, carboxy or sulfo, R[2] is hydrogen, methyl, ethyl, methoxy, ethoxy, chlorine or bromine, R[3] is hydrogen, methyl, ethyl, methoxy, ethoxy, chlorine, bromine, carboxy or sulfo, and R[4] is hydrogen, methyl, ethyl, methoxy, ethoxy, chlorine or bromine, it being possible for R[1], R[2], R[3] and R[4] to have meanings identical with one another or different from one another;

R is carboxy or carboalkoxy having 2 to 5 carbon atoms;

X is β-thiosulfatoethyl or β-sulfatoethyl, or

X is vinyl, and in that case R[1] or R[2] or both represent each sulfo, and

Y is β-thiosulfatoethyl or β-sulfatoethyl, or

Y is vinyl, and in that case R[1] or R[2] or both represent each sulfo, and the two groups —SO$_2$—X and —SO$_2$—Y have meanings identical with or different from one another.

2. A compound according to claim 1, wherein X is β-sulfatoethyl.

3. A compound according to claim 1, wherein Y is β-sulfatoethyl.

4. A compound according to claim 2, wherein Y is β-sulfatoethyl.

5. A compound according to claim 1, wherein R[1] is hydrogen.

6. A compound according to claim 4, wherein R[1] is hydrogen.

7. A compound according to claim 1, wherein R[1] and R[2] are both hydrogen.

8. A compound according to claim 4, wherein R[1] and R[2] are both hydrogen.

9. A compound according to claim 1, wherein R[3] is hydrogen.

10. A compound according to claim 4, wherein R[3] is hydrogen.

11. A compound according to claim 1, wherein R[4] is hydrogen.

12. A compound according to claim 4, wherein R[4] is hydrogen.

13. A compound according to claim 1 of the formula

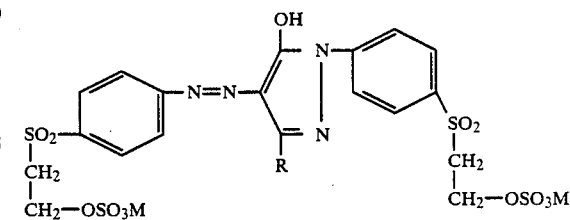

in which R is carboxy or carboalkoxy having 2 to 5 carbon atoms and M is hydrogen or an alkali metal.

14. A compound according to claim 13, wherein R is carboethoxy.

15. A compound according to claim 13, wherein R is carboxy.

* * * * *